United States Patent [19]

May

[11] 3,921,766

[45] Nov. 25, 1975

[54] TRAILER BRAKE

[75] Inventor: John May, Sturgis, S. Dak.

[73] Assignee: May & Egger, Inc., Sturgis, S. Dak.

[22] Filed: Mar. 5, 1974

[21] Appl. No.: 448,229

[52] U.S. Cl. .................... 188/167; 188/9; 188/112; 280/428
[51] Int. Cl.² .......................................... B60T 13/04
[58] Field of Search .......... 188/167, 168, 110, 112, 188/114, 31, 69, 9; 280/428, 432

[56] References Cited
UNITED STATES PATENTS

| | | | |
|---|---|---|---|
| 2,305,603 | 12/1942 | Cadman | 280/432 |
| 2,887,183 | 5/1959 | Ross | 188/112 |
| 3,007,552 | 11/1961 | Eksergian | 188/112 |
| 3,168,940 | 2/1965 | Ross et al. | 188/112 |
| 3,570,633 | 3/1971 | Garnett | 188/112 |
| 3,780,833 | 12/1973 | Sundermann | 188/9 |

FOREIGN PATENTS OR APPLICATIONS

| | | | |
|---|---|---|---|
| 48,256 | 8/1889 | Germany | 188/31 |

Primary Examiner—Trygve M. Blix
Assistant Examiner—Edward R. Kazenske
Attorney, Agent, or Firm—Edwin L. Spangler, Jr.

[57] ABSTRACT

This invention relates to a spring-actuated trailer brake characterized by a push rod mounted for reciprocating movement transversely of the trailer between a retracted position disengaged from the wheel nearest the adjacent shoulder of the road and an extended position in operative engagement with the latter, a friction shoe carried on the wheel-engaging end of the push rod, spring means normally biasing said push rod into extended position, a retractable latch pin releasably holding the push rod in its retracted position against the bias of the spring means, and a lanyard attached between the safety chain on the towing vehicle and the latch pin operative retract the latter when the trailer becomes unhitched and said chain goes taut.

1 Claim, 5 Drawing Figures

U.S. Patent  Nov. 25, 1975  3,921,766
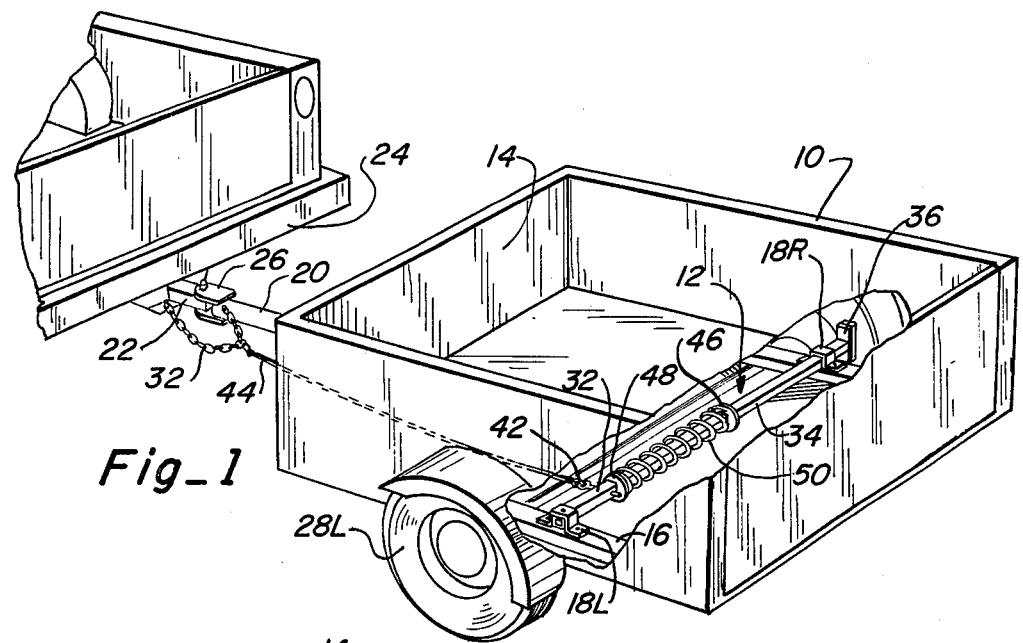
Fig_1
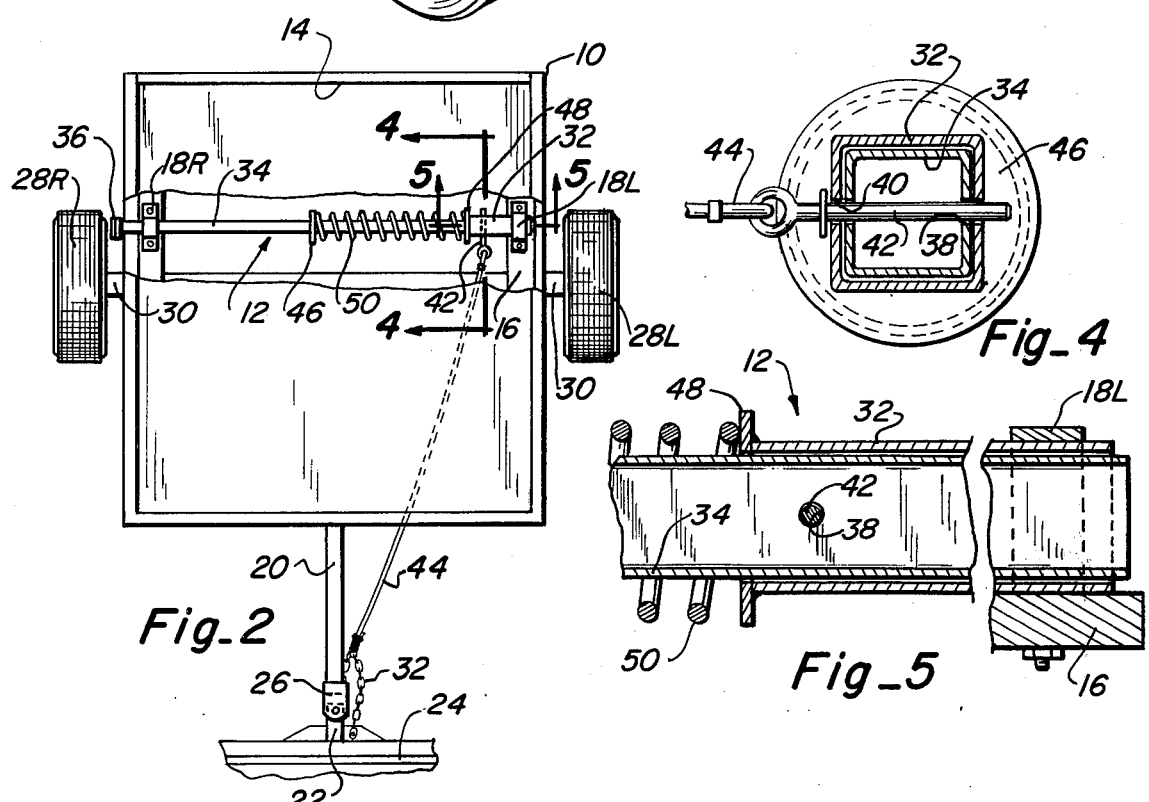
Fig_2
Fig_4
Fig_5
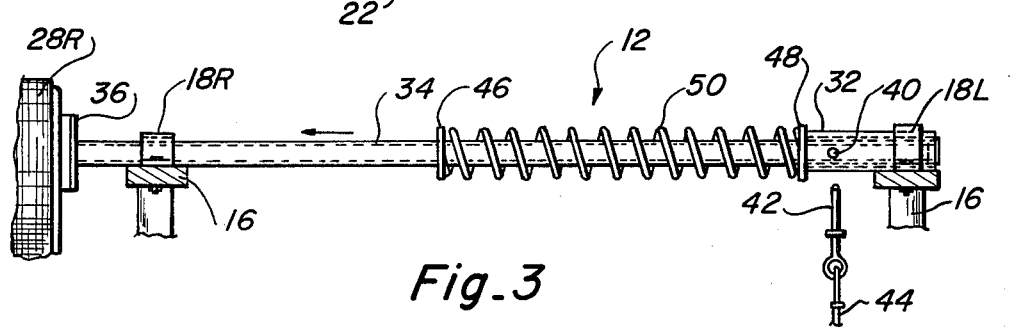
Fig_3 ized pipe section with an open tube of 3,921,766

TRAILER BRAKE

BACKGROUND AND SUMMARY OF THE INVENTION

While essentially all large trailers are fitted with conventional air-actuated brake systems operable by the driver of the towing vehicle or tractor, most small ones including many sizeable house trailers, boat trailers and the like have no braking system at all, but instead, have only a stoplight hooked up to the towing vehicle's braking system which is responsive to actuation of the latter. Because of the difficulty and expense involved in providing the trailer with a braking system operable from the towing vehicle and having essentially the same response, the problem has been short circuited by requiring warning systems on the trailer and safety hitches of some type to lessen the danger of its breaking completely free. Despite these precautions, trailers do, occasionally, come loose and they present a potentially lethal hazard to other drivers on the same highway as they are both unguided and without any steering mechanism that controls their movement automatically or otherwise.

It has now been found in accordance with the teaching of the instant invention that these and other problems associated with the towing of brakeless trailers can, in large measure, be eliminated through the novel, but unobvious, expedient of providing each such unit with an independent self-actuating brake automatically operative when the trailer breaks loose from the towed vehicle to guide same off the road and out of the path of oncoming traffic. The unit is simple and requires no hydraulic or electrical hook-up to the towed vehicle, but only a most rudimentary mechanical one. By braking only the outside wheel while leaving the trailer attached to the towing vehicle by means of the safety chain even though unhitched, the trailer is guided to the right and onto the shoulder instead of across the road into the lane of oncoming traffic. Even if the trailer should, for some reason, break loose completely, its tendency will be to "cartwheel" over onto the shoulder and into the ditch. Most important, the trailer is being brought to a stop rather than continuing to run free.

It is, therefore, the principal object of the present invention to provide a novel and improved braking system for small trailers.

A second objective is the provision of an apparatus of the type aforementioned that is self-actuating and independent of the braking system of the towed vehicle.

Another object of the within described invention is to provide a trailer brake that operates on only the outside wheel nearest the shoulder thus imparting a "guidance" factor to the trailer that has broken loose.

Still another objective is the provision of an automatic brake for two-wheeled trailers that cooperates with the safety chain to which it is attached to guide the unit over onto the shoulder of the road out of the way of oncoming traffic.

An additional object is to provide a unit of the type herein disclosed and claimed which is easily mounted on existing trailers with little or no modification thereof being required.

Further objects are to provide a trailer brake that is inexpensive, easy to install, reliable, rugged, maintenance free, compact, versatile, lightweight and simple to rig to the towing vehicle.

Other objects will be in part apparent and in part pointed out specifically hereinafter in connection with the description of the drawings that follows, and in which:

FIG. 1 is a fragmentary perspective view, portions of which have been broken away to reveal the interior construction, showing a small two-wheeled trailer equipped with the trailer brake of the present invention hitched to a towing vehicle as seen from a vantage point above the left rear corner thereof;

FIG. 2 is a fragmentary top plain view to a somewhat reduced scale, again having portions of the trailer bed broken away to expose the brake therebeneath;

FIG. 3 is a greatly enlarged fragmentary elevation of the braking system, wheel and elements of the trailer frame;

FIG. 4 is a still further enlarged section taken along line 4—4 of FIG. 2; and,

FIG. 5 is a fragmentary section to the same scale as FIG. 4 taken along line 5—5 of FIG. 2, portions thereof having been broken away to conserve space.

DETAILED DESCRIPTION OF THE INVENTION

Referring next to the drawings for a detailed description of the present invention and, initially, to FIGS. 1 and 2 for this purpose, reference number 10 has been chosen to designate a two-wheeled trailer of conventional design equipped with the novel braking system forming the subject matter hereof, the latter having been broadly referred to by reference number 12. The trailer is shown with an open-topped box type bed 14 resting atop a frame 16 which also defines the support for the braking system that is attached to the side frame elements thereof by shackles 18. A tongue 20 extends forwardly from the frame to its point of attachment with the drawbar 22 at the rear end of the towing vehicle 24 by means of a conventional hitch 26. Wheels 28 are mounted for rotation in conventional fashion on the opposite outboard ends of axle 30. A conventional safety chain 32 is connected between the towing vehicle 24 and trailer 10 in the usual way.

Next, with reference to all five figures of the drawings, the braking mechanism 12 will be seen to include a hollow guide tube 32 into which a push rod 34 is telescoped. In the retracted inoperative position shown in FIGS. 2, 4 and 5, the friction pad or brake shoe 36 on the remote end of the push rod is left out of engagement with the outside (righthand) wheel 28R running nearest the shoulder as can be seen most clearly in FIG. 2. Lefthand shackle 18L as seen from a point behind the trailer looking forwardly defines a fixed attachment for the guide tube 32; whereas, the righthand shackle 18R defines a tunnel within which the push rod freely reciprocates between its retracted inoperative and extended operative positions.

As seen most clearly in FIGS. 4 and 5, the guide tube and push rod include pairs of apertures 38 and 40 which line up with one another in retracted position and receive latch pin 42. A lanyard 44 is strung taut between the latch pin 42 and slack safety chain 32 as shown in FIGS. 1 and 2. The slack left in the safety chain and the point at which the lanyard is connected thereto must be such that the latch pin will be pulled completely free of the aligned apertures whenever the trailer becomes unhitched and falls further behind the towing vehicle thus drawing the safety chain taut. In other words, the lanyard should be connected to the safety chain such that little or no slack is left ahead of the point of attachment between it and the towing vehicle. Conversely, enough slack must be left behind in the section of the safety chain lying between the lanyard's point of attachment therewith and its attachment to the trailer to insure the pin will be pulled all the way free thus releasing the telescopic connection between the push rod and guide tube therefor.

Spaced abutments 46 and 48 are carried by the push rod 34 and guide tube 32 respectively, between which is held compressed a compression spring 50 when the subassembly is latched in retracted position. When, of course, the occasion occurs that the trailer becomes unhitched from the towing vehicle and the safety chain goes taut pulling the latch pin, spring 50 extends to bias the brakeshoe against the right trailer wheel 28R. As this occurs, the tongue 20 will tend to drop down and swing to the right underneath the hitch 26 within the limits defined by the slack in the safety chain because of the selective braking action on only the righthand wheel. Thus while a severe side pull of sufficient magnitude to cause the driver to lose control of the towing vehicle is unlikely to occur, an instantly noticeable sidewise thrust will become apparent that tells the driver something is amiss. Also, the path of the trailer is off the highway and onto the shoulder out of the way of oncoming traffic due to the selective braking action kept under control by the connection with the towing vehicle that remains intact through the medium of the safety chain. Furthermore, if the worst should happen and the trailer breaks completely free of the towing vehicle, the chances are good that the trailer will head off the highway into the ditch instead of into oncoming traffic. Regardless of what path it takes, however, it is being braked to a stop and is not allowed to run free.

What is claimed is:

1. A braking system for two-wheeled trailers having an axle with a righthand side and a lefthand side wheel comprising: a push rod mounted for reciprocating movement transversely of the trailer between a retracted inoperative position and an extended operative position, guide means sized to telescopically receive the push rod, said guide means and push rod including alignable apertures occupying a registered relation in the retracted inoperative position of the said push rod; spring means connected to the push rod normally urging said rod into extended operative position, a brakeshoe attached to the push rod for frictionally engaging only the righthand side wheel when said push rod is in extended operative position, retractable latch means connected to the push rod releasably latching said push rod in retracted inoperative position, said latch means comprising a pin detachably received within said alignable apertures when in register with one another, and latch-actuating means connected to the latch means and connectable to a towing vehicle, said means being operative upon separation of said trailer and towing vehicle to retract the latch pin releasing the push rod into extended operative position thereby braking the righthand side wheel and causing the trailer to turn aside from oncoming traffic.

* * * * *